(12) United States Patent
Licht

(10) Patent No.: US 6,207,324 B1
(45) Date of Patent: Mar. 27, 2001

(54) ZINC SULFUR BATTERY

(75) Inventor: Stuart Licht, Haifa (IL)

(73) Assignee: Technion Research & Development Foundation, Ltd.

( * ) Notice: Subject to any disclaimer, the term of this patent is extended or adjusted under 35 U.S.C. 154(b) by 0 days.

(21) Appl. No.: 09/402,079

(22) PCT Filed: Mar. 31, 1998

(86) PCT No.: PCT/IL98/00156

§ 371 Date: Dec. 22, 1999

§ 102(e) Date: Dec. 22, 1999

(87) PCT Pub. No.: WO98/44578

PCT Pub. Date: Oct. 8, 1998

(30) Foreign Application Priority Data

Mar. 31, 1997 (IL) ........................................... 120557

(51) Int. Cl.[7] ............... H01M 4/36; H01M 4/58
(52) U.S. Cl. ..................... 429/229; 429/207; 429/105
(58) Field of Search .................... 429/229, 207, 429/105

(56) References Cited

U.S. PATENT DOCUMENTS

| 3,920,474 | 11/1975 | Zito, Jr. et al. . | |
| 4,828,942 | 5/1989 | Licht | 429/50 |
| 5,413,881 | 5/1995 | Licht et al. | 429/105 |
| 5,424,147 | 6/1995 | Khasin et al. | 429/119 |
| 5,571,600 | 11/1996 | Licht | 429/188 |

*Primary Examiner*—Laura Weiner
(74) *Attorney, Agent, or Firm*—Morgan & Finnegan, LLP

(57) ABSTRACT

An electric storage cell (10) comprises a zinc anode (12) and a sulfur cathode (14), wherein the zinc and the sulfur are in contact with an aqueous solution (22) containing sulfur during the process of battery discharge. In this invention, specific conditions for the aqueous sulfur electrolyte are chosen to overcome the normal ineffectiveness of zinc oxidation in the presence of aqueous zero valent sulfur. Normally, a zinc anode (12) cannot be oxidized in an aqueous solution containing sulfur, because the product of the discharge would be zinc sulfide. This zinc sulfide is a highly insoluble salt and creates a layer which passivates the zinc and renders it completely ineffective to battery discharge. The performance of the battery is made possible by high OH- and HS-ion concentrations formed by the addition of salts to the aqueous zero valent sulfur solution, and permits effective and efficient battery discharge.

18 Claims, 5 Drawing Sheets

ZINC SULFUR BATTERY

The present invention relates to batteries. More particularly, the invention relates to electrical storage cells of the type having half cells in operative electrochemical contact.

BACKGROUND OF THE INVENTION

There is an ongoing need for providing novel improved electrical storage batteries, which are low-cost and high energy density. The two most commonly used types of batteries are the lead-acid battery as employed in automobiles and the dry cell as used in most flashlights. The light weight of sulfur, makes sulfur-based batteries to be quite attractive for electrochemical energy storage and accordingly a variety of metal-molten sulfur batteries are described in the literature. High temperature molten alkali sulfide batteries have been investigated, but serious problems were encountered with the high temperatures required for maintaining a liquid phase, the electrical insulation, passivation of sulfur, as well as safety considerations.

Although less conductive than molten salts, the often toxic. oganosulfo cathodes, such as discussed in the U.S. Pat. No. 4,833,048, using materials of the general formula $(R(S)_y)_n$, where R is a chemical component containing from 1 to 20 carbon atoms, can be used as a cathode, however the additional weight of the carbon will decrease the electrical storage capacity. Recently, concentrated aqueous polysulfide solutions were found to provide a medium for highly reversible two electrons redox chemistry at ambient temperature. In a paper by the present Inventor (Journal Electrochemical Society, 1987, 134, p. 2137–41) aqueous sulfur redox cells were mentioned to possess a high faradaic capacity. The cells are utilizing electrolytes which by their mass could accommodate more reducible sulfur than water. In a later paper (Journal Electrochemical Society, 1993, 140, p. L4) the inventor describes aluminum-sulfur batteries based on concentrated polysulfide catholytes and an alkaline aluminum anode.

The present Inventor also described in his prior U.S. Pat. No. 4,828,942 an aqueous sulfur cathode containing at least 20% by weight sulfur in a battery with a sulfide anode. The room temperature sulfur electrolyte, provides a conductive and reversible battery which possesses a high capacity half-cell storage material. In 1993, the capacity of the cathode was further increased by the addition of solid sulfur, as described by Peramunage and Licht, (Science, 1993, 261, p. 1029). According to the recent U.S. Pat. No. 5,424,147 (by Khasin) a water-activated, deferred-action battery is disclosed. The cathode of the battery is made from a skeletal frame which comprises cuprous chloride, sulfur, carbon and a water-ionizable salt, compacted and fused under pressure and heat. The sulfur in the cathode acts to improve the discharge of the cuprous chloride, but the sulfur itself is not discharged. The anode is selected from the group consisting of zinc, magnesium, aluminum and alloys thereof. Although this type of battery has an advantage by not using lead, known by its environmental problem, it suffers from a disadvantage connected with the manufacture of the skeletal frame of said cathode. From a storage capacity and environmental view, zinc is an attractive anode material which is used in several batteries including dry cells. However, a zinc anode cannot be oxidized in an aqueous solution containing sulfur, because the product of the discharge is zinc sulfide:

$$Zn+S^{2-} \rightarrow ZnS+2e^- \qquad (1)$$

The present Inventor determined than zinc sulfide was even less soluble than previously thought. (Journal Electrochemical Society, 1988, 135, p. 2971) which would prevent dissolution, with a solubility product of $10^{-25.4}$ given by:

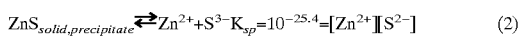
$$ZnS_{solid,precipitate} \rightleftarrows Zn^{2+}+S^{3-} \, K_{sp}=10^{-25.4}=[Zn^{2+}][S^{2-}] \qquad (2)$$

This zinc sulfide is a highly insoluble salt and creates a layer which passivates zinc and rendering it completely ineffective to battery discharge.

It is an object of the present invention to provide a safe and reliable battery, capable of producing high energy densities. It is another objective of the invention is to provide a battery made of relatively inexpensive materials.

BRIEF DESCRIPTION OF THE INVENTION

The invention relates to a novel type of battery which comprises two half-cells which are positioned in electrochemical contact with one another through an aqueous solution, wherein one or said half-cells comprises a zinc anode and the second half-cell comprises an aqueous solution of a concentrated metal cation hydrosulfide salt and a reducible sulfur in a amount of at least 0.01 moles per kg, being positioned in an electron transferring contact with a current transferring electrocatalytic electrode. The discharge of the battery is based on the oxidation of the zinc, which occurs despite the presence of sulfur, by using a high concentration of hydrosulfide and hydroxide in the solution.

DETAILED DESCRIPTION OF THE INVENTION

Figure 1:
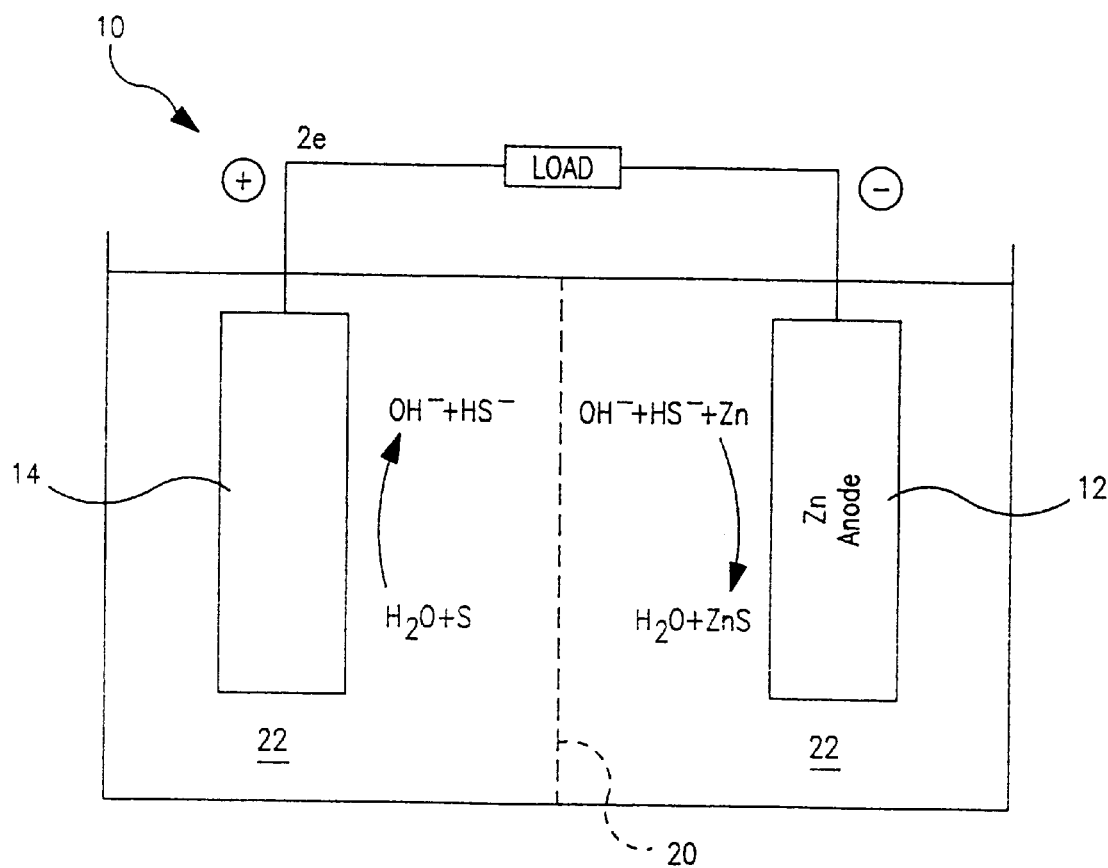
FIG. 1: is a diagrammatic representation of a zinc sulfur battery.

The battery according to the present invention, is based on the use of a zinc anode half cell with a sulfur half cell, including an aqueous sulfur solution containing a hydrosulfide and a hydroxide salt, in contact with an electron transferring electrocatalytic electrode which sustains an electrochemical reduction of the dissolved sulfur. The discharge of the battery is based on the oxidation of the zinc, which occurs despite the presence of sulfur, by using a high concentration of hydrosulfide and hydroxide in the solution.

The anode of the battery may consist of a low surface area as well as a high surface zinc. Among the low surface area it should be mentioned planar sheet, rods, etc. Among the high surface area zinc, it should be mentioned porous zinc, zinc screen, pressed zinc powder, etc. The zinc may be pure, or less pure (92% to 99%) either due to impurities or alloying. Among the impurities and alloy materials should be mentioned those common to zinc including tungsten, cobalt, lead, copper, selenium, antimony, germanium, sulfur, iron, cadmium, nickel, manganese, tin and the other known zinc allowing materials. The hydrosulfide salt may be selected from alkali hydrosulfide having the formula MHS, wherein M is an alkali cation to be obtained by the reaction of alkali hydroxide and hydrogen sulfide. The presence of high concentrations of the hydroxide or hydrosulfide will permit the zinc oxidation, despite the presence of sulfur. According to the invention, without being bound to any theory, the oxidation reaction of zinc in sulfide electrolytes occurs as follows:

$$Zn + HS^- + OH^- \rightarrow ZnS + 2e^- + H_2O \qquad (3)$$

It seems that in this reaction, the anion $OH^-$ or $HS^-$ will facilitate the zinc oxidation, despite the presence of sulfide. The sulfur cathode contains sulfur, S, dissolved as a variety of polysulfide species, and discharge of the sulfur cathode may be summarized:

$$S + H_2O + 2e^- \rightarrow HS^- + OH^- \qquad (4)$$

Without being bound to any theory, the oxidation reaction of zinc, in sulfur electrolytes occurs according to the reaction:

$$Zn + S \rightarrow ZnS \quad E_{cell} = 0.90 \text{ V} \qquad (5)$$

Moreover, a high capacity will be achieved due to zinc sulfide discharge product. The faradaic capacity of the Zn/S battery based on 2 faraday of charge transfer per mole of Zn (65.38 g/mole) and sulfur (32.06 g/mole), is 550 Ah/kg, and the theoretical specific energy is 495 Wh/kg (0.90 Volt×550 Ah/kg). Effective zinc oxidation, despite the presence of sulfide, as well as the high capacity due to the zinc sulfide discharge product, are the new advances which now permit demonstration of a viable zinc sulfur battery. The performance of the battery is enhanced by conditions of high $OH^-$ and $HS^-$ concentrations.

According to a preferred embodiment, the solution in said electrolyte contains more than 1 mole per kg of a hydrosulfide salt, wherein said hydrosulfide is selected from the group consisting of alkali cations, alkali-earth cations, transition metal cations, cations of group IIIA, group IVA, group VA and Hydrogen. Typical examples of such hydrosulfide salts include, but are not limited to, KHS, NaHS, LiHS, CsHS, RbHS, $H_2S$, $Be(HS)_2$, $Mg(HS)_2$, $Ca(HS)_2$, $SrHS_2$, HgHS, $Hg(HS)_2$, CuHS, $CuHS_2$, $Zn(HS)_2$, AgHS, $Fe(HS)_2$, $Fe_2(FeO_4)_3$, $Mn(HS)_2$, $Ni(NS)_2$, $Co(HS)_2$, $Al(HS)_3$, $In(HS)_3$, $Ga(HS)_3$, $Sn(HS)_4$, $Sn(HS)_2$, $Pb(HS)_2$. The solution also contains a hydroxide salt of an element selected from the group consisting of alkali cations, alkali earth cations, transition metal cations and cations of group IIIA elements in an amount of above 1 mole per kg of a hydroxide salt. Typical examples of such hydroxide salts include, but are not limited to, KOH, NaOH, LiOH, CsOH, RbOH, $H_2S$, $Be(OH)_2$, $Mg(OH)_2$, $CaOH_2$, HgOH, $Hg(OH)_2$, CuOH, $Cu(OH)_2$, $Zn(OH)_2$, AgOH, $Fe(OH)_2$, $Fe_2(FeO_4)_3$, $Mn(OH)_2$, $Ni(OH)_2$, $Co(OH)_2$, $Al(OH)_3$, $In(OH)_3$, $Ga(OH)_3$, $Sn(OH)_4$, $Sn(OH)_2$, $Pb(OH)_2$, etc. In this preferred embodiment, the anode contains zinc metal which is capable to be oxidized. The solution contains also dissolved sulfur which may be reduced upon discharge and contact with an electrocatalytic electrode such as CoS.

In another preferred embodiment, the cell contains means to impeded transfer of the chemically reactive sulfur between said zinc anode and sulfur present in said other half cell. Examples of such means includes, but is not limited a membrane, ceramic frit, or agar solution to be located in a position which separate the said half cells.

In another aspect of the invention, the cell may also be rechargeable by applying a voltage in excess of the voltage as measured without resistive loads of the discharged, or partially discharged cell. In another embodiment, the cell also contains an excess of undissolved sulfur.

By "discharge cell open circuit potential", as used herein, is meant the voltage, as measured without resistive load, of the discharged or partially discharged cell.

Among the advantages of the present invention, it should be mentioned the capability of a high electrical storage capacity with inexpensive materials such as zinc and sulfur as well as the fact that the battery does not need to operate at high temperatures in order to obtain a discharge of sulfur.

DESCRIPTION OF THE PREFERRED EMBODIMENTS

The present invention provides a battery which is based upon zinc anode half cell and a sulfur half cell, including an aqueous sulfur solution containing a hydrosulfide and a hydroxide salt, in contact with an electron transferring electrocatalytic electrode sustaining electrochemical reduction of dissolved sulfur. Discharge of the battery is based on oxidation of the zinc occurring, despite the presence of sulfur, by using concentrated hydrosulfide and hydroxide in solution. The zinc anode of the battery can consist of low surface area as well as a high surface zinc. The hydrosulfide salt, including, but not limited to, alkali hydrosulfide salts in the form of, MHS, where M is a an alkali cation, may be prepared by reaction of $H_2S$ in an alkaline hydroxide solution according to the reaction:

$$H_2S + MOH \rightarrow MHS + H_2O \qquad (6)$$

High concentrations of KOH or KHS can permit zinc oxidation, despite the presence of sulfur.

In FIG. 1, the cell (10) is a diagrammatic representation of an electrochemical storage cell based on a sulfur half cell, an electrically neutral ionic conductor (22) and a zinc anode (12). The electrically neutral ionic conductor (22) may be a concentrated solution of aqueous KOH and KHS containing dissolved sulfur, in contact with an electrocatalytic cathode (14) such as CoS. Reduction of sulfur ions such as in the form of a polysulfide anions, is achieved via electrons which are supplied by said electrode (4). The zinc anode electrode (12) such as in the form of a metal, is also in contact with the electrically neutral ionic conductor (22). During the oxidation of the anode, electrons are released. Optionally, the cell may contain an ion selective membrane (20), or a separator (20), for minimizing the non-electrochemical interaction, or preventing electrical contact, between the cathode and the anode.

The invention will be hereafter illustrated by the following Examples, being understood that the Examples are presented only for a better understanding of the invention without implying any limitation thereof, the invention being covered by the appended claims.

EXAMPLE I

High anodic current density is necessary to permit effective battery discharge. According to the theory, and as seen in the following Examples, a zinc sulfur battery would not be able to discharge in an aqueous polysulfide solution comprising polysulfide anions since the zinc sulfide product of the battery discharge is insoluble and not conductive. Also, this example illustrates that normally, a zinc anode can not be oxidized in an aqueous solution containing sulfur. This example also illustrates that normally, a zinc anode is easily oxidized in an aqueous solution containing hydroxide. High anodic current density is necessary to permit effective battery discharge.

TABLE 1

Normally dissolved sulfur solutions do not support zinc discharge currents. The oxidation current of planar 99.9% zinc electrodes is measured at various potentials in 2 molal $K_2S_4$ or 3 molal KOH, and at 22° C. or 75°. The cell potential, $V_{cell}$, in units of millivolts, mV, is determined relative to a separate sulfur cathode. $J_{Zn}$ is the oxidation current measured on a planar zinc electrode.

| Zinc in 2 molal $K_2S_4$ | | | | Zinc in 3 molal KOH | | | |
|---|---|---|---|---|---|---|---|
| T = 22° C. | | T = 75° C. | | T = 22° C. | | T = 75° C. | |
| $V_{cell}$ mV | $J_{Zn}$ mA/cm² | $V_{cell}$ mV | $J_{Zn}$ mA/cm² | $V_{cell}$ mV | $J_{Zn}$ mA/cm² | $V_{cell}$ mV | $J_{Zn}$ mA/cm² |
| 850 | 0.0 | 850 | 0.0 | 810 | 0.0 | 920 | 0.0 |
| 750 | 0.0 | 750 | 0.0 | 770 | 10.0 | 880 | 10.0 |
| 650 | 0.0 | 650 | 0.0 | 740 | 20.0 | 850 | 20.0 |
| 550 | 0.0 | 550 | 0.0 | 710 | 30.0 | 820 | 30.0 |
| 450 | 0.0 | 450 | 0.0 | 685 | 40.0 | 795 | 40.0 |
| 350 | 0.0 | 350 | 0.0 | 665 | 50.0 | 775 | 50.0 |
| 250 | 0.0 | 250 | 0.0 | 645 | 60.0 | 755 | 60.0 |
| 150 | 0.0 | 150 | 0.0 | 625 | 70.0 | 735 | 70.0 |
| 100 | 0.0 | 100 | 0.0 | 605 | 80.0 | 715 | 80.0 |
| 50 | 0.0 | 50 | 0.0 | 580 | 90.0 | 695 | 90.0 |
| 0 | 0.0 | 0 | 0.0 | 560 | 100.0 | 670 | 100.0 |

A planar zinc electrode was inserted in an aqueous solution which contained potassium hydroxide (3 molal) facilitating anode discharge (zinc oxidation) at a high current density of 100 mA/cm², the anodic potential being enhanced by increasing the temperature from 25° C. to 75° C. as can be noticed in Table 1. As shown in the Table, there is no electrochemical evidence of any zinc oxidation and virtually no oxidation current existed when soluble sulfur, such as potassium tetrasulfide, was added to the solution. In the above temperature range, it was found that the addition of sulfur completely passivates the zinc and no electrochemical oxidation current was noticed.

EXAMPLE II

This example illustrates one set of experimental conditions, consisting of concentrated hydroxide, in which zinc oxidation to zinc sulfide can occur despite the presence of dissolved sulfur. Several experiments were carried out using concentrated hydroxide solutions, in which zinc oxidation was found to occur despite the presence of dissolved sulfur. This is observed in the experimental measurements summarized in Table 2. Each experiment contained concentrated dissolved sulfur in solution (8m $K_2S_4$). As is apparent, when the solution contains 10.7 moles or higher KOH concentration, a significant discharge (oxidation) current in excess of 10 mA/cm² occurs. At a lower concentration of KOH, such as 9 moles per kg and less, no zinc oxidation occurred. At lower concentrations of KOH such as 2.7 moles no zinc anodic oxidation occurred and a reduction (negative) current, destructive to the battery occurred.

TABLE 2

High hydroxide concentration will permit high zinc discharge currents in dissolved sulfur solutions. The oxidation current of planar 99.9% zinc electrodes is measured at various applied potentials in 8 molal $K_2S_4$ containing different concentrations of KOH at 50° C. The cell potential ($V_{cell}$), in units of millivolts, mV, is determined relative to a separate sulfur cathode.

in 8 molal $K_2S_4$ and no KOH:
$V_{cell}$   $J_{Zn}$
0 to 900 mV   no Zn oxidation current, high reduction current.

TABLE 2-continued

High hydroxide concentration will permit high zinc discharge currents in dissolved sulfur solutions. The oxidation current of planar 99.9% zinc electrodes is measured at various applied potentials in 8 molal $K_2S_4$ containing different concentrations of KOH at 50° C. The cell potential ($V_{cell}$), in units of millivolts, mV, is determined relative to a separate sulfur cathode.

in 8 molal $K_2S_4$ and 1 molal KOH:
$V_{cell}$   $J_{Zn}$
0 to 900 mV   no Zn oxidation current, high reduction current.
in 8 molal $K_2S_4$ and 3 molal KOH:
$V_{cell}$   $J_{Zn}$
0 to 900 mV   no Zn oxidation current, moderate reduction current.
in 8 molal $K_2S_4$ and 9 molal KOH:
$V_{cell}$   $J_{Zn}$
0 to 950 mV   no Zn oxidation current, small reduction current.
in 8 molal $K_2S_4$ and 10 to 15 molal KOH:
$V_{cell}$   $J_{Zn}$
0 to 950 mV   high zinc oxidation current, no reduction current.
Zinc current, in units of mA/cm², in 8 molal $K_2S_4$ and 9 to 15 molal KOH at 50° C.:

| $V_{cell}$ | $J_{Zn}$(9 m KOH) | $J_{Zn}$(11 m KOH) | $J_{Zn}$(13 m KOH) | $J_{Zn}$(15 m KOH) |
|---|---|---|---|---|
| 900 | −2 | +1 | −1 | 0 |
| 850 | −1 | +4 | 0 | +2 |
| 800 | 0 | +11 | +5 | +12 |
| 750 | 0 | +13 | +23 | +26 |
| 100 | 0 | | | |

EXAMPLE III

This example illustrates a second set of experimental conditions, consisting of dissolved hydrosulfide salts and dissolved hydroxide salts, in which zinc oxidation can occur in the presence of a sulfur containing aqueous solution. As observed in Table 4, a hydrosulfide salt and hydroxide salt solution, such as 1 molal KHS with 4 molal KOH, can permit a sustained zinc oxidation, although a lower current density than in the pure hydroxide consisting of 3 molal KOH. Without being bound to any theory, this zinc oxidation KHS containing solution is achieved because KHS contains sulfur, but the sulfur is only in the reduced state and cannot chemically react with Zn to form the insoluble passivating ZnS film. Therefore the anodic zinc oxidation can be sustained.

TABLE 3

Dissolved hydrosulfide and hydroxide will permit high zinc discharge currents. The oxidation current of planar 99.9% zinc electrodes is measured at various applied potentials at 50° C. The cell potential ($V_{cell}$), in units of millivolts, (mV), is determined relative to a separate sulfur cathode. $J_{Zn}$ is the oxidation current measured on a planar zinc electrode.

Zinc current, in units of mA/cm² at 50° C.:

| $V_{cell}$ | $J_{Zn}$(3 m KOH) | $J_{Zn}$(1 m KHS + 4 m KOH) |
|---|---|---|
| 900 | 0 | 0 |
| 850 | +4 | 0 |
| 800 | +25 | +27 |
| 750 | +50 | +50 |

TABLE 4

High hydroxide will enhance zinc discharge currents in hydrosulfide containing solutions. The oxidation current of planar 99.9% zinc electrodes is measured at various applied potentials in 9 molal KHS containing different concentrations of KOH at 50° C. The cell potential ($V_{cell}$), in units of millivolts, (mV), is determined relative to a separate sulfur cathode.

Zinc current, in units of mA/cm$^2$, in 8 molal KHS and 12 to 18 molal KOH at 50° C.:

| $V_{cell}$ | $J_{Zn}$(12 m KOH) | $J_{Zn}$(15 m KOH) | $J_{Zn}$(18 m KOH) |
|---|---|---|---|
| 900 | 0 | 0 | +1 |
| 850 | +2 | +2 | +10 |
| 800 | +5 | +5 | +15 |
| 750 | +12 | +12 | +22 |
| 700 | +21 | +27 | +31 |

As summarized in Table 4, high zinc discharge currents are accomplished even in high concentration hydrosulfide solutions, and the magnitude of the zinc anodic current is enhanced with higher concentrations of KOH is solution.

EXAMPLE IV

This example illustrates conditions in which a zinc anode can be coupled with a sulfur cathode to permit discharge of a zinc sulfur battery. In this example, various zinc sulfur battery discharges are attempted using a planar zinc anode and a planar CoS electrocatalytic cathode, immersed in an aqueous solution containing sulfur. As illustrated by the solid triangles in FIG. 2, the battery is completely inert to discharge in a 6 molal KOH solution containing 0.64 g sulfur (dissolved as 7.3 molal $K_2S_4$) and 0.72 g KOH. In this cell, immediately following immersion of the electrodes into solution, a small open circuit voltage of 0.68 V is observed which falls quickly, and under discharge load conditions, no current occurs.

Figure 2:
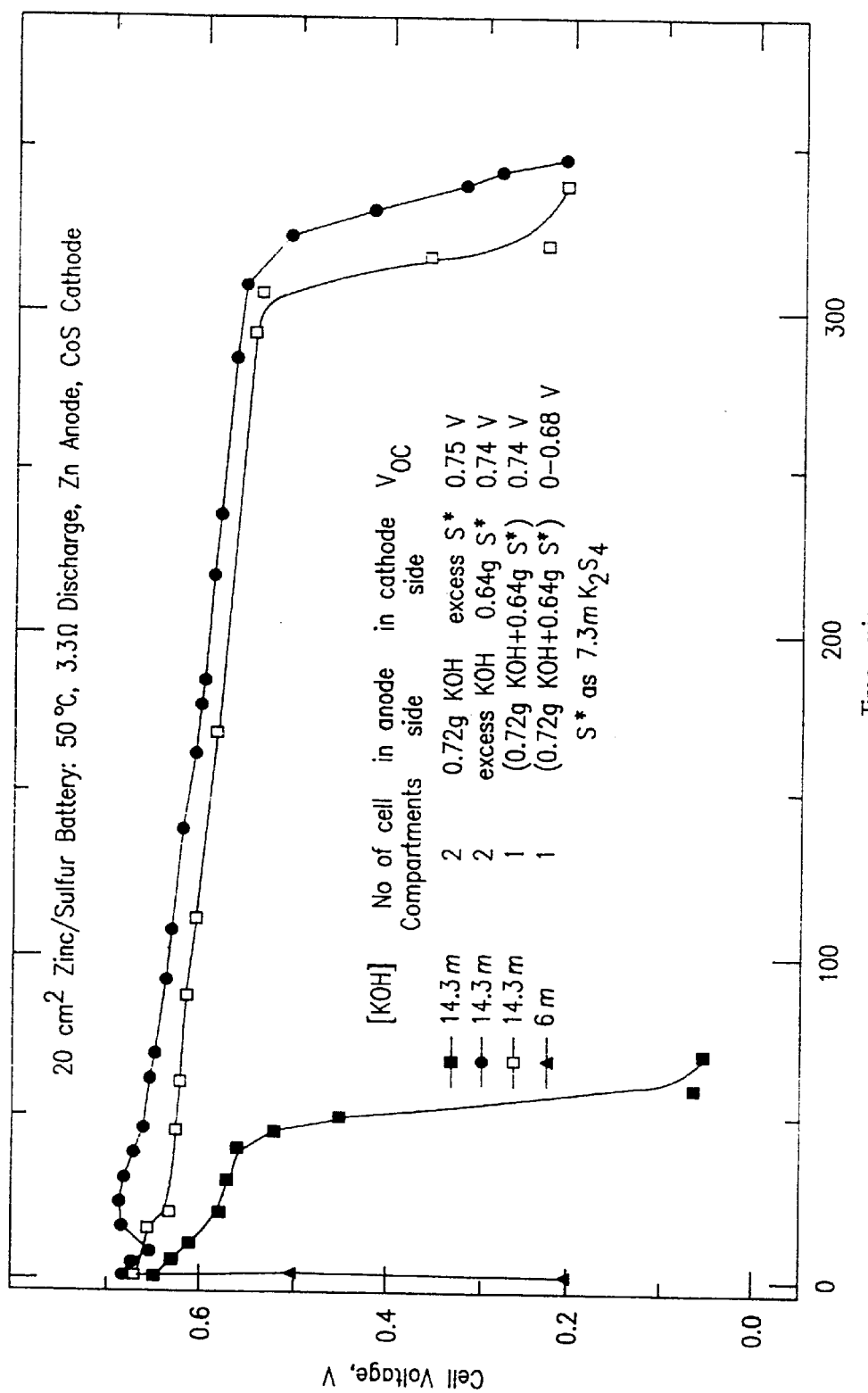
FIGS. 2–5, correlate the discharge capacity (amp hours) of various zinc-sulfur batteries at 50° C. as a function of cell voltage.

As illustrated by the curve containing the solid squares in FIG. 2, a small, but significant, charge capacity can be sustained when the anode is prevented from contact with the sulfur containing solutions. In this cell, the anode is still in contact with a solution containing 0.72 g KOH, but sulfur is not in that solution. The 0.64 g sulfur is contained in a second solution in a second compartment also containing the CoS electrode, and is separated from the zinc anode compartment. The separation is achieved by a membrane situated between the anode and cathode compartments which prevents anion movement, but permits cation movement, such as the HD2291 membrane sold by Permion Company, N.Y. In this cell, discharge is sustained for 70 minutes, and this duration of discharge is attributed to the limited mass of KOH in the zinc compartment. As illustrated by the curve containing the solid circles in FIG. 2, in the two compartment zinc sulfur battery cell, a large capacity can be sustained when the anode compartment is not limited in KOH mass. The anode contains a tenfold excess of KOH. Due to the significant increase in KOH mass, this cell has extended capacity. Discharge is sustained for 300 minutes, and this duration of discharge is attributed to the limited mass of sulfur, 0.64 g, in the sulfur compartment.

The final curve, the open squares, illustrates in FIG. 2 a single compartment cell, containing 0.64 g sulfur (dissolved as 7.3 molal $K_2S_4$) and again only 0.72 g KOH, However, in this case the KOH is present as 14.3 molal KOH, so that zinc oxidation can occur despite contact with solution phase sulfur. In this cell, an open circuit voltage of 0.74 V is observed which is steady and represents a significant portion of the theoretical voltage of a zinc sulfur battery described in equation 5. In this cell, the discharge capacity is considerably greater than the 6 molal KOH inert cell, or the KOH mass limited cell, and approaches that of the separated compartment excess KOH cell.

EXAMPLE V

This examples illustrates that the solid square discharge curve illustrated in FIG. 2 is limited and constrained by the charge contained in the 0.72 g KOH. In this two compartment cell, sulfur is not available near the anode, and in the absence of sulfur and without being bound to any theory, the two electron zinc anode oxidation is constrained by the non-sulfur oxidation product:

$$Zn+4OH^- \rightarrow ZnO_2^{2-}+H_2O+2e^- \quad (7)$$

Figure 3:
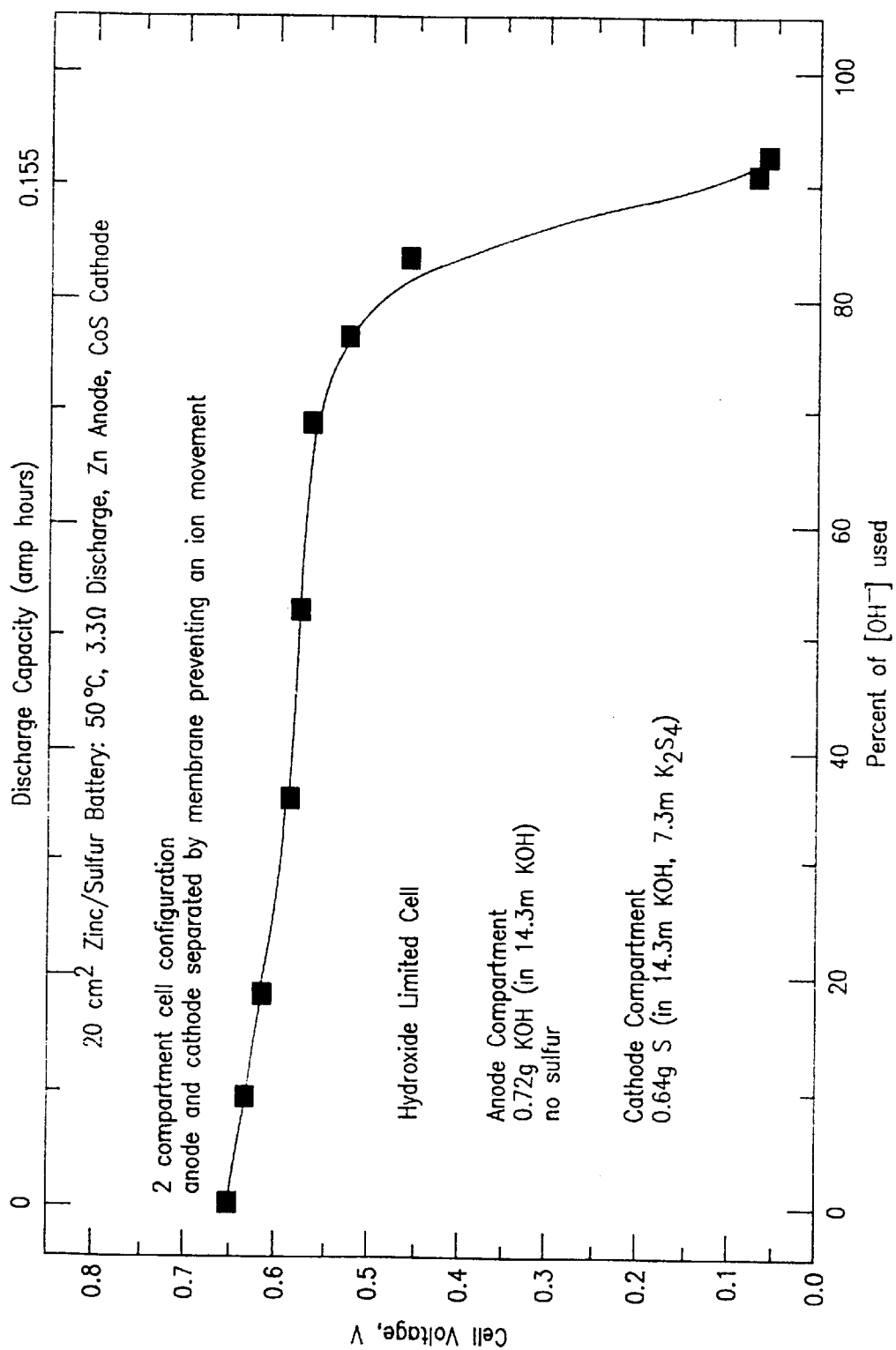

According to equation 4, each 4 moles of KOH will generate a maximum of two moles (equivalent to two faradays of charge at 96485 amp seconds of charge per faraday) during zinc oxidation. FIG. 3 illustrates the fraction of this charge, calculated from 0.72 g KOH=0.128 moles KOH, attained during the 60 minute discharge of this two compartment zinc sulfur battery. It is seen in the figure that approximately 90% of this KOH limiting charge is generated by the cell during discharge.

EXAMPLE VI

Figure 4:
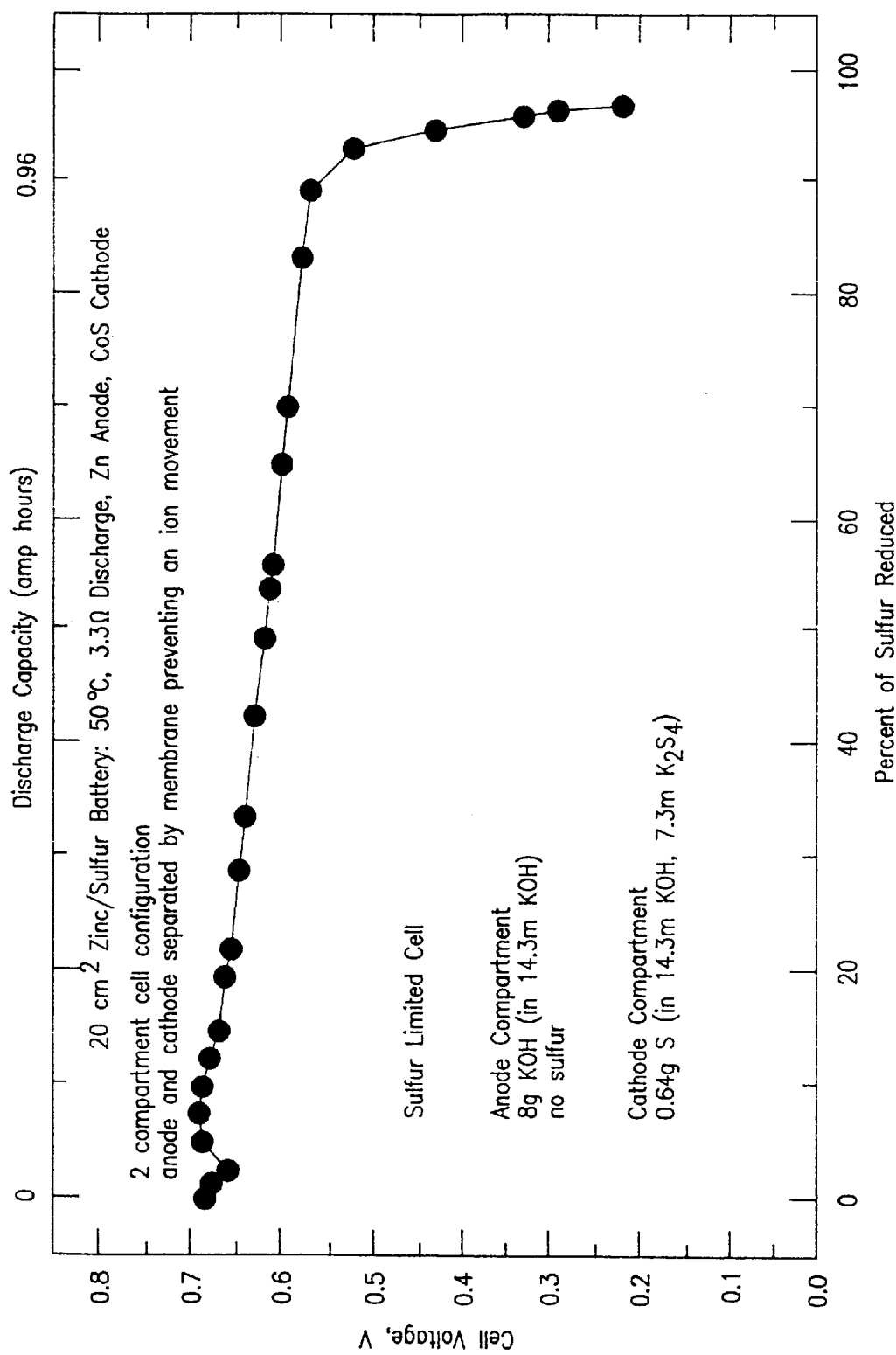

This example illustrates that the solid circle discharge curve illustrated in FIG. 2 is limited and constrained by the charge contained in the 0.64 g sulfur. This two compartment cell contains an excess of KOH according to equation 7, and the duration of discharge is limited by the sulfur near the CoS electrode. Without being bound to any theory, according to equation 4, each mole of sulfur will generate a maximum of two moles during sulfur reduction. FIG. 4 illustrates the fraction of this charge, as calculated from 0.72 g KOH=0.128 moles KOH, attained during the 300 minute discharge of this two compartment zinc sulfur battery, and it is seen in the Figure that over 90% of this KOH limiting charge is generated by the cell during discharge.

EXAMPLE VII

Figure 5:
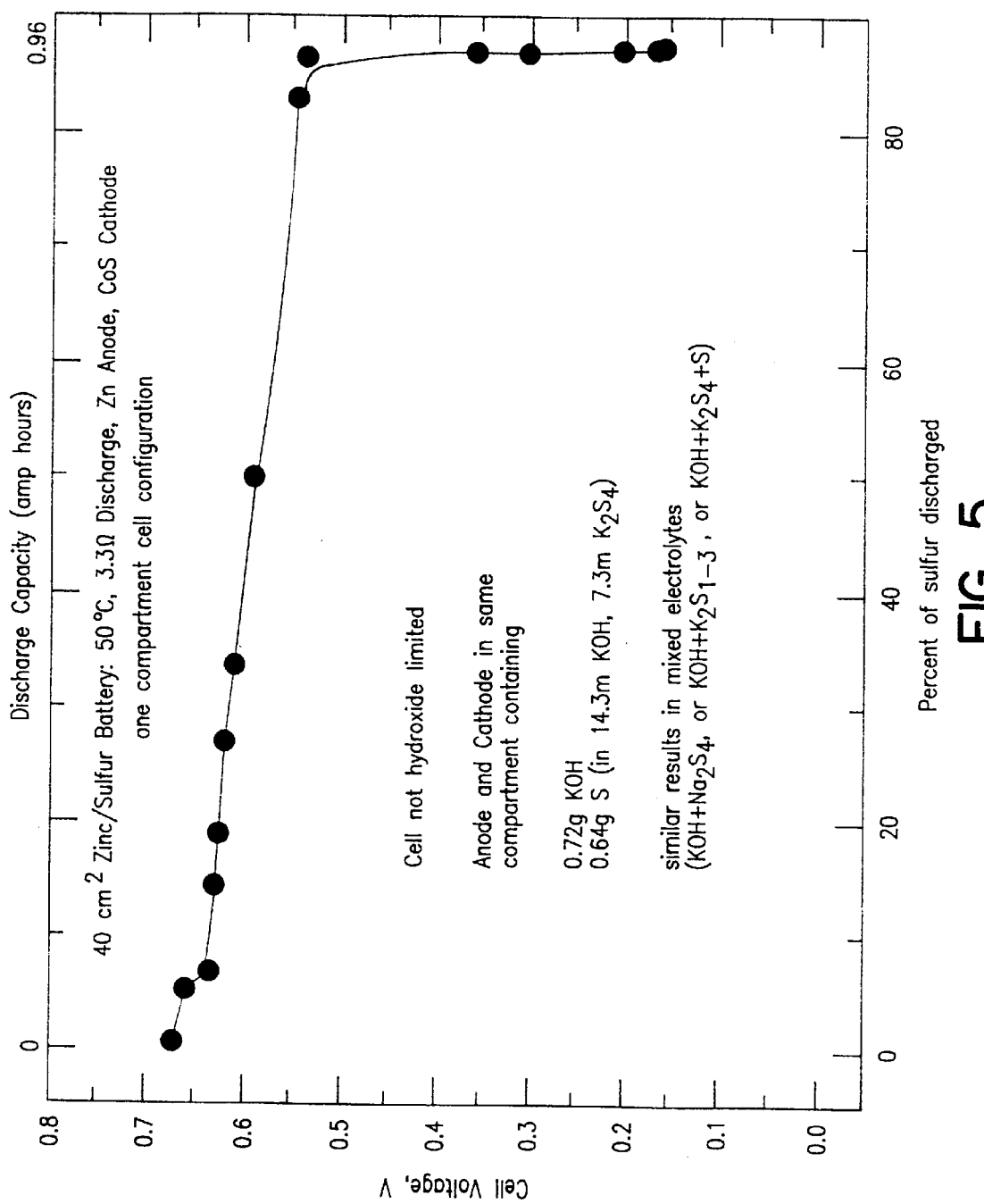

This example illustrates that the open square discharge curve illustrated in FIG. 2 is limited and constrained by the charge contained in the 0.64 g sulfur, and not limited by the KOH mass. This one compartment cell does effectively discharge for a long duration, despite the presence of dissolved sulfur in contact with the zinc anode, and despite the 0.72 g KOH which limited a discharge duration in the two compartment cell. Duration of discharge is limited by the sulfur present near the CoS electrode. As illustrated in FIG. 5, each mole of sulfur generates approximately 80% of the maximum of two moles during sulfur reduction. This extended discharge precludes the possibility of $ZnO_2^{2-}$ as the discharge product and therefore, without being bound to any theory, the extended discharge can be ascribed to the process given by equation 5. It seems that, the concentrated hydroxide permits an effective zinc oxidation, as described by equation 3, despite zinc contact with aqueous sulfur. The resultant zinc sulfur battery combines the attributes of the low mass, high storage capacity cell, available in a single compartment configuration cell, with the attribute of high effective discharge current available in the two compartment configuration cell.

What is claimed is:

1. A battery comprising two half-cells which are positioned in electrochemical contact with one another through an aqueous solution, wherein one of said half-cells comprises a zinc anode and the second half-cell comprises an aqueous solution of a concentrated metal cation hydrosulfide salt, a concentrated metal cation hydroxide salt and a reducible sulfur in an amount of at least 0.01 moles per kg, being positioned in an electron transferring contact with a current transferring electrocatalytic electrode.

2. The battery according to claim 1, wherein the zinc anode is selected from a high surface area and a low surface area.

3. The battery according to claim 1, wherein said zinc anode is selected from a zinc alloy containing at least 92% to 99% purity of zinc metal.

4. The battery according to claim 1, wherein said metal cation hydrosulfide is selected from an alkali hydrosulfide having a general formula MHS, wherein M is an alkali cation.

5. The battery according to claim 1, wherein the cation in said hydrosulfide salt is selected from one of the groups IIA, IIIA, IVA, VA, transition metals and hydrogen.

6. The battery of claim 1, wherein said solution contains a hydrosulfide salt in an amount over 0.1 mole per kg.

7. The battery according to claim 6, wherein said solution contains a hydrosulfide salt in an amount of more than one mole per kg.

8. The battery according to claim 6, wherein said solution contains a hydrosulfide salt in an amount of over 9 moles per kg.

9. The battery according to claim 1, wherein said metal cation hydroxide is selected from an alkali hydroxide having the general formula MOH.

10. The battery according to claim 1, wherein the cation in said hydroxide salt is selected from the group IIA, IIIA, IVA and VA.

11. The battery according to claim 1, wherein the solution in said electrolyte contains up to 1 mole per kg of hydroxide salt.

12. The battery according to claim 1, wherein said solution contains a hydroxide salt in an amount over 1 mole per kg.

13. The battery according to claim 1, wherein said solution contains a hydroxide salt in an amount of over 9 moles per kg.

14. The battery according to claim 1, wherein the cell contains means to impede a transfer of the reactive sulfur between said zinc anode and sulfur present in said other half cell.

15. The battery according to claim 14, wherein said means are selected from a membrane, ceramic frit and an agar solution, located in a position which separate said half cells.

16. The battery according to claim 1, which is rechargeable by application of a voltage in excess of the discharge cell open circuit potential.

17. The battery according to claim 1, wherein a portion of said reducible sulfur is in the form of undissolved solid sulfur in the surrounding of the cell.

18. A battery comprising two half-cells positioned in electrochemical contact with one another through the aqueous solution of concentrated metal cation hydrosulfide salt, metal cation hydroxide salt and reducible sulfur of claim 1.

* * * * *